United States Patent
Grubka et al.

(10) Patent No.: US 10,151,500 B2
(45) Date of Patent: Dec. 11, 2018

(54) RIDGE VENT

(75) Inventors: Lawrence Jerome Grubka, Westerville, OH (US); Brian Robert Ray, Whitehouse, OH (US); Geoffrey Howard Wilson, Ottawa Hills, OH (US); John Paul Devlin, Tewksbury, MA (US); David Swett, Waltham, MA (US); Mark Bui Breneman, Boston, MA (US); James Steven Pelletier, North Grafton, MA (US); Kurt Michael Maw, Salem, MA (US)

(73) Assignee: OWENS CORNING INTELLECTUAL CAPITAL, LLC, Toledo, OH (US)

( * ) Notice: Subject to any disclaimer, the term of this patent is extended or adjusted under 35 U.S.C. 154(b) by 876 days.

(21) Appl. No.: 12/393,261

(22) Filed: Feb. 26, 2009

(65) Prior Publication Data
US 2010/0112932 A1    May 6, 2010

Related U.S. Application Data

(63) Continuation-in-part of application No. 29/327,214, filed on Oct. 31, 2008, now Pat. No. Des. 628,718.
(Continued)

(51) Int. Cl.
*F24F 7/02* (2006.01)
*E04D 13/17* (2006.01)

(52) U.S. Cl.
CPC .............. *F24F 7/02* (2013.01); *E04D 13/174* (2013.01); *Y10T 29/53* (2015.01)

(58) Field of Classification Search
CPC ........... F24F 7/02; E04B 7/022; E04D 13/174
(Continued)

(56) References Cited

U.S. PATENT DOCUMENTS

| 2,447,472 A | 8/1948 | Donley |
| 2,518,550 A * | 8/1950 | Ives ..................... B65D 65/403 |
| | | 428/132 |

(Continued)

FOREIGN PATENT DOCUMENTS

| DE | 3935600 A1 | 3/1990 |
| GB | 428720 | 5/1935 |

(Continued)

OTHER PUBLICATIONS

Installation Instructions for Owens Corning VentSure Rigid Strip Ridge Vent dated Mar. 2000.
(Continued)

*Primary Examiner* — Steven B McAllister
*Assistant Examiner* — Samantha Probst
(74) *Attorney, Agent, or Firm* — Calfee, Halter & Griswold LLP

(57) ABSTRACT

Ridge vents configured to cover an open ridge of a roof and allow a flow of air to exit from the open ridge through the ridge vents are provided. The ridge vents include a center portion having a length and a plurality of grooves. Left and right portions are connected to the center portion. The center portion is configured to flex along it's length, thereby forming a ridge vent angle between the left and right portions. The formed ridge vent angle is configured to correspond with a slope between roof decks defining the open ridge.

24 Claims, 8 Drawing Sheets

Related U.S. Application Data and a continuation-in-part of application No. 29/332,162, filed on Feb. 10, 2009, now Pat. No. Des. 615,218.

(58) Field of Classification Search
USPC .................................................. 454/366, 365
See application file for complete search history.

(56) References Cited

U.S. PATENT DOCUMENTS

| | | | |
|---|---|---|---|
| 2,724,872 A * | 11/1955 | Herbes ........................... | 52/553 |
| 2,777,381 A | 1/1957 | Noyes | |
| 3,189,471 A | 6/1965 | Thomas | |
| D203,484 S | 1/1966 | Rousey et al. | |
| 3,484,259 A | 12/1969 | Lewis et al. | |
| 3,524,738 A | 8/1970 | Grubb et al. | |
| 3,535,096 A | 10/1970 | Bour et al. | |
| 3,625,134 A | 12/1971 | Smith | |
| 3,694,982 A * | 10/1972 | Gerhaher ....................... | 52/302.1 |
| 3,804,646 A | 4/1974 | Dumbaugh, Jr. | |
| 3,861,926 A | 1/1975 | Irlam et al. | |
| 3,887,386 A | 6/1975 | Majumdar | |
| 3,892,581 A | 7/1975 | Burgman et al. | |
| 3,904,423 A | 9/1975 | Guthrie | |
| 4,063,001 A | 12/1977 | Zlochower | |
| 4,199,364 A | 4/1980 | Neely | |
| D256,047 S | 7/1980 | Wormington | |
| 4,212,692 A | 7/1980 | Rasen et al. | |
| 4,252,590 A | 2/1981 | Rasen et al. | |
| 4,315,392 A | 2/1982 | Sylvest | |
| 4,325,290 A | 4/1982 | Wolfert | |
| 4,325,724 A | 4/1982 | Froberg | |
| 4,366,251 A | 12/1982 | Rapp | |
| 4,375,527 A | 3/1983 | Zahner | |
| 4,393,634 A | 7/1983 | McDermott et al. | |
| RE31,599 E | 6/1984 | Rasen et al. | |
| 4,491,951 A | 1/1985 | Dunn | |
| 4,530,193 A | 7/1985 | Ochs | |
| 4,554,862 A | 11/1985 | Wolfert | |
| 4,582,748 A | 4/1986 | Eastes | |
| 4,643,080 A * | 2/1987 | Trostle et al. ................. | 454/365 |
| 4,676,147 A | 6/1987 | Mankowski | |
| 4,689,258 A | 8/1987 | Siosberg et al. | |
| 4,762,053 A | 8/1988 | Wolfert | |
| 4,764,487 A | 8/1988 | Lewis | |
| 4,776,262 A | 10/1988 | Curran | |
| 4,803,813 A | 2/1989 | Fiterman | |
| 4,805,367 A | 2/1989 | Kleckner | |
| 4,807,409 A | 2/1989 | Sells | |
| 4,810,573 A | 3/1989 | Harriett | |
| 4,817,506 A | 4/1989 | Cashman | |
| 4,843,953 A | 7/1989 | Sells | |
| 4,852,517 A | 8/1989 | Smith et al. | |
| 4,857,485 A | 8/1989 | Brennan et al. | |
| 4,892,846 A | 1/1990 | Rogers et al. | |
| 4,903,445 A | 2/1990 | Mankowski | |
| 4,924,761 A | 5/1990 | MacLeod et al. | |
| 4,935,291 A | 6/1990 | Gunnink | |
| 4,942,699 A | 7/1990 | Spinelli | |
| 4,957,037 A * | 9/1990 | Tubbesing ................ | F24F 7/02 |
| | | | 454/366 |
| 4,976,587 A | 12/1990 | Johnston et al. | |
| 4,996,812 A | 3/1991 | Venable | |
| 5,009,149 A | 4/1991 | MacLeod et al. | |
| 5,022,203 A * | 6/1991 | Boyd ........................... | 52/199 |
| 5,052,286 A | 10/1991 | Tubbesing et al. | |
| 5,054,254 A | 10/1991 | Sells | |
| 5,054,377 A | 10/1991 | Mochel et al. | |
| 5,092,225 A | 3/1992 | Sells | |
| 5,094,041 A | 3/1992 | Kasner et al. | |
| 5,095,810 A | 3/1992 | Robinson | |
| 5,099,627 A | 3/1992 | Coulton et al. | |
| 5,122,095 A | 6/1992 | Wolfert | |
| 5,134,827 A * | 8/1992 | Hartman ....................... | 52/584.1 |
| 5,149,301 A | 9/1992 | Gates | |
| 5,167,579 A | 12/1992 | Rotter | |
| 5,238,450 A | 8/1993 | Rotter | |
| D342,129 S | 12/1993 | Goetz, Jr. | |
| 5,288,269 A | 2/1994 | Hansen | |
| 5,302,444 A | 4/1994 | Jackson et al. | |
| 5,304,095 A | 4/1994 | Morris | |
| 5,326,318 A | 7/1994 | Rotter | |
| 5,328,406 A | 7/1994 | Morris, Jr. | |
| 5,331,783 A * | 7/1994 | Kasner et al. .................. | 52/199 |
| 5,332,699 A | 7/1994 | Olds et al. | |
| 5,352,154 A | 10/1994 | Rotter | |
| 5,425,672 A | 6/1995 | Rotter | |
| 5,427,571 A | 6/1995 | Sells | |
| 5,439,417 A | 8/1995 | Sells | |
| 5,457,920 A | 10/1995 | Waltz | |
| 5,458,538 A | 10/1995 | MacLeod et al. | |
| 5,474,425 A | 12/1995 | Lawlor | |
| 5,502,286 A | 3/1996 | Pollman et al. | |
| 5,542,224 A | 8/1996 | Olsen | |
| 5,542,882 A | 8/1996 | Sells | |
| 5,560,157 A | 10/1996 | Rotter | |
| 5,560,158 A | 10/1996 | Norton | |
| 5,561,953 A | 10/1996 | Rotter | |
| 5,569,629 A | 10/1996 | TenEyck et al. | |
| 5,573,844 A | 11/1996 | Donovan et al. | |
| 5,576,252 A | 11/1996 | Rapp et al. | |
| 5,585,312 A | 12/1996 | TenEyck et al. | |
| 5,596,847 A | 1/1997 | Stephenson | |
| 5,603,567 A | 2/1997 | Peacock | |
| 5,630,752 A | 5/1997 | Glubash | |
| 5,636,481 A * | 6/1997 | De Zen ............................ | 52/95 |
| 5,651,734 A | 7/1997 | Morris | |
| 5,673,521 A * | 10/1997 | Coulton ................ | E04D 13/176 |
| | | | 126/671 |
| 5,676,597 A | 10/1997 | Bettoli et al. | |
| 5,704,834 A | 1/1998 | Sells | |
| 5,772,502 A | 6/1998 | Smith | |
| 5,789,329 A | 8/1998 | Eastes et al. | |
| 5,797,222 A | 8/1998 | Martin | |
| 5,826,390 A * | 10/1998 | Sacks ............................ | 52/408 |
| 5,830,059 A | 11/1998 | Sells | |
| 5,832,677 A | 11/1998 | Kurttila | |
| 5,851,932 A | 12/1998 | Dickson et al. | |
| 5,921,863 A | 7/1999 | Sells | |
| 5,934,995 A | 8/1999 | Morris et al. | |
| 5,935,886 A | 8/1999 | Jensen et al. | |
| 5,946,868 A | 9/1999 | Morris | |
| 5,947,817 A | 9/1999 | Morris et al. | |
| 5,948,535 A | 9/1999 | Chiurlo et al. | |
| 5,962,354 A | 10/1999 | Fyles et al. | |
| 5,971,848 A | 10/1999 | Nair et al. | |
| 5,996,289 A | 12/1999 | Allaster | |
| 5,997,977 A | 12/1999 | Zou et al. | |
| 6,015,343 A | 1/2000 | Castillo et al. | |
| 6,039,646 A | 3/2000 | Sells | |
| 6,063,470 A | 5/2000 | Zou et al. | |
| 6,068,551 A | 5/2000 | Oremland | |
| 6,086,755 A | 7/2000 | Tepper | |
| 6,101,847 A | 8/2000 | Shapm et al. | |
| 6,128,869 A | 10/2000 | Brotherton et al. | |
| 6,129,628 A | 10/2000 | O'Hagin et al. | |
| 6,136,735 A | 10/2000 | Gallo et al. | |
| 6,145,255 A | 11/2000 | Allaster | |
| 6,149,517 A | 11/2000 | Hansen | |
| 6,165,066 A | 12/2000 | Sharp et al. | |
| 6,174,119 B1 | 1/2001 | Orr | |
| 6,212,833 B1 | 4/2001 | Henderson | |
| 6,213,868 B1 | 4/2001 | Sells | |
| 6,214,429 B1 | 4/2001 | Zou et al. | |
| D442,273 S | 5/2001 | Pestell | |
| 6,227,963 B1 | 5/2001 | Headrick | |
| 6,233,887 B1 | 5/2001 | Smith | |
| 6,237,369 B1 | 5/2001 | LeBlanc et al. | |
| 6,248,678 B1 | 6/2001 | Pinckney | |
| 6,260,315 B1 | 7/2001 | Smith | |
| 6,267,668 B1 | 7/2001 | Morris | |
| 6,277,024 B1 | 8/2001 | Coulton | |
| RE37,388 E | 9/2001 | Kasner et al. | |
| 6,286,273 B1 | 9/2001 | Villela et al. | |

(56) References Cited

U.S. PATENT DOCUMENTS

| | | |
|---|---|---|
| 6,296,912 B1 | 10/2001 | Zickell |
| 6,298,613 B1 | 10/2001 | Coulton et al. |
| 6,299,528 B1 | 10/2001 | Hansen |
| 6,302,785 B1 | 10/2001 | McKinney et al. |
| 6,306,786 B1 | 10/2001 | Koyama et al. |
| 6,314,760 B1 | 11/2001 | Chenoweth |
| 6,329,310 B1 | 12/2001 | Peuchert et al. |
| 6,357,193 B1 | 3/2002 | Morris |
| 6,361,434 B1 | 3/2002 | Brandon |
| 6,371,847 B2 | 4/2002 | Headrick |
| 6,399,527 B1 | 6/2002 | Kishimoto et al. |
| 6,418,692 B1 | 7/2002 | Freshwater et al. |
| D462,790 S | 9/2002 | Bullinger et al. |
| 6,447,392 B1 | 9/2002 | Henderson |
| 6,450,882 B1 | 9/2002 | Morris et al. |
| 6,457,943 B1 | 10/2002 | Olsen et al. |
| 6,458,029 B2 | 10/2002 | Morris |
| D465,839 S | 11/2002 | Sells |
| 6,482,084 B2 | 11/2002 | Hansen |
| 6,487,826 B1 | 12/2002 | McCorsley et al. |
| 6,491,581 B1 | 12/2002 | Mankowski |
| 6,530,189 B2 | 3/2003 | Freshwater et al. |
| 6,537,147 B2 | 3/2003 | Smith |
| 6,540,508 B1 | 4/2003 | Simpson et al. |
| 6,558,251 B2 | 5/2003 | Sells |
| 6,565,431 B1 | 5/2003 | Villela |
| 6,578,325 B2 | 6/2003 | Henderson |
| 6,579,599 B1 | 6/2003 | Blum et al. |
| 6,589,113 B2 | 7/2003 | Sells |
| 6,595,849 B2 | 7/2003 | Miller |
| 6,598,356 B1 | 7/2003 | Sells |
| 6,599,184 B2 | 7/2003 | Morris |
| 6,623,354 B2 | 9/2003 | Morris et al. |
| 6,684,581 B2 | 2/2004 | Robinson et al. |
| 6,686,304 B1 | 2/2004 | Wallenberger |
| 6,705,052 B1 | 3/2004 | Larson |
| 6,793,574 B1 | 9/2004 | Robinson |
| 6,809,050 B1 | 10/2004 | McGinnis |
| D503,790 S | 4/2005 | Dodge et al. |
| 6,881,144 B2 | 4/2005 | Hansen et al. |
| 6,913,530 B2 | 7/2005 | Morris et al. |
| 6,933,045 B2 | 8/2005 | Tamura |
| 6,933,252 B2 | 8/2005 | Pierce |
| 6,954,947 B1 | 10/2005 | Williams, Jr. |
| D511,847 S | 11/2005 | Ciepliski |
| D511,848 S | 11/2005 | Ciepliski |
| 6,981,916 B2 | 1/2006 | Coulton |
| 6,991,535 B2 | 1/2006 | Ciepliski et al. |
| 6,998,361 B2 | 2/2006 | Lewis |
| 7,024,828 B2 | 4/2006 | Headrick |
| 7,044,852 B2 | 5/2006 | Horton |
| D527,813 S | 9/2006 | Dodge et al. |
| 7,143,557 B1 | 12/2006 | Ayers, Jr. |
| 7,165,363 B2 | 1/2007 | Headrick et al. |
| 7,182,688 B2 | 2/2007 | Coulton |
| 7,219,473 B2 | 5/2007 | Mantyla et al. |
| D549,316 S | 8/2007 | O'Hagin et al. |
| 7,259,118 B2 | 8/2007 | Jubb et al. |
| D555,237 S | 11/2007 | O'Hagin |
| 7,302,776 B2 | 12/2007 | Duncan et al. |
| 7,384,331 B2 | 6/2008 | Couton |
| D574,947 S | 8/2008 | Grisham et al. |
| 7,449,419 B2 | 11/2008 | Li |
| 7,484,335 B1 | 2/2009 | Dunlap |
| 7,485,034 B2 | 2/2009 | Sells |
| 7,520,098 B1 | 4/2009 | Martinique et al. |
| 7,527,554 B2 * | 5/2009 | Schmid ............... E04D 1/365 454/365 |
| 7,537,518 B2 | 5/2009 | Villela et al. |
| 7,540,803 B2 | 6/2009 | Sells |
| 7,562,498 B2 | 7/2009 | Galeazzo |
| 7,591,109 B2 | 9/2009 | Rotter |
| 7,594,362 B2 | 9/2009 | Sigmund et al. |
| D602,579 S | 10/2009 | Stone |
| 7,604,536 B2 | 10/2009 | Coulton et al. |
| 7,644,545 B2 | 1/2010 | Mankell et al. |
| 7,662,037 B2 * | 2/2010 | Polston ..................... 454/365 |
| D615,218 S | 5/2010 | Grubka |
| 7,716,894 B2 | 5/2010 | Jolitz |
| D618,331 S | 6/2010 | Lomanco |
| 7,765,750 B2 | 8/2010 | Duncan |
| 7,765,754 B2 * | 8/2010 | Johnson et al. ............. 52/302.3 |
| 7,766,735 B2 | 8/2010 | Ciepliski et al. |
| 7,823,343 B1 | 11/2010 | Inzeo |
| D628,718 S | 12/2010 | Grubka |
| 7,856,764 B2 | 12/2010 | Korteum et al. |
| 8,028,475 B2 | 10/2011 | Sigmund et al. |
| 8,061,102 B2 | 11/2011 | Turek et al. |
| D654,161 S | 2/2012 | Holland et al. |
| 8,136,322 B2 | 3/2012 | Shadwell et al. |
| 8,292,707 B2 | 10/2012 | Grisham et al. |
| 8,322,089 B2 | 12/2012 | Railkar et al. |
| D694,394 S | 11/2013 | Polston |
| D710,985 S | 8/2014 | Gassman |
| 2001/0019941 A1 | 9/2001 | Headrick |
| 2002/0000101 A1 | 1/2002 | Chenoweth |
| 2002/0045528 A1 | 4/2002 | Kusuno et al. |
| 2003/0077178 A1 | 4/2003 | Stearns |
| 2003/0166446 A1 | 9/2003 | Lewis |
| 2003/0188554 A1 | 10/2003 | Baker et al. |
| 2003/0207748 A1 | 11/2003 | Wallenberger |
| 2003/0224922 A1 | 12/2003 | Wallenberger |
| 2004/0029523 A1 | 2/2004 | Morris et al. |
| 2004/0088928 A1 | 5/2004 | Headrick, II et al. |
| 2004/0092379 A1 | 5/2004 | Lewis |
| 2004/0198216 A1 | 10/2004 | Morris et al. |
| 2004/0237428 A1 | 12/2004 | Headrick et al. |
| 2005/0014624 A1 | 1/2005 | Jubb et al. |
| 2005/0031703 A1 | 2/2005 | Beier |
| 2005/0084440 A1 | 4/2005 | Chacon et al. |
| 2005/0085369 A1 | 4/2005 | Jensen |
| 2005/0090377 A1 | 4/2005 | Shelestak et al. |
| 2005/0130581 A1 | 6/2005 | Dodge |
| 2005/0130825 A1 | 6/2005 | Kravchenko et al. |
| 2005/0136830 A1 | 6/2005 | Morris et al. |
| 2005/0232828 A1 | 10/2005 | Merry |
| 2005/0234216 A1 | 10/2005 | Klein et al. |
| 2006/0003884 A1 | 1/2006 | Nishizawa et al. |
| 2006/0040608 A1 | 2/2006 | Coulton |
| 2006/0079173 A1 | 4/2006 | Coulton et al. |
| 2006/0116069 A1 | 6/2006 | Urbanski et al. |
| 2006/0154597 A1 | 7/2006 | Coulton et al. |
| 2006/0211366 A1 | 9/2006 | Villela et al. |
| 2006/0229010 A1 | 10/2006 | Villela et al. |
| 2006/0240762 A1 | 10/2006 | Railkar et al. |
| 2006/0257240 A1 | 11/2006 | Naskali et al. |
| 2007/0000192 A1 | 1/2007 | Mantyla et al. |
| 2007/0026789 A1 | 2/2007 | Villela |
| 2007/0049190 A1 | 3/2007 | Singh |
| 2007/0054612 A1 | 3/2007 | Ehrman et al. |
| 2007/0072539 A1 | 3/2007 | Sells |
| 2007/0072540 A1 | 3/2007 | Ciepliski et al. |
| 2007/0094953 A1 | 5/2007 | Galeazzo et al. |
| 2007/0105701 A1 | 5/2007 | Hofmann et al. |
| 2007/0107220 A1 | 5/2007 | Bakhuis et al. |
| 2007/0117505 A1 | 5/2007 | Wey et al. |
| 2007/0213003 A1 | 9/2007 | Railkar |
| 2007/0234650 A1 | 10/2007 | Coulton et al. |
| 2008/0009403 A1 | 1/2008 | Hofmann et al. |
| 2008/0064320 A1 | 3/2008 | Polston |
| 2008/0125028 A1 | 5/2008 | Morris et al. |
| 2008/0182507 A1 | 7/2008 | Morris et al. |
| 2008/0287054 A1 * | 11/2008 | Carlson ............... E04D 13/174 454/365 |
| 2008/0299892 A1 | 12/2008 | Robinson |
| 2009/0126286 A1 | 5/2009 | Sigmund et al. |
| 2009/0130969 A1 | 5/2009 | Grisham et al. |
| 2009/0166928 A1 | 7/2009 | Carlson |
| 2009/0233541 A1 | 9/2009 | Holland et al. |
| 2010/0043311 A1 | 2/2010 | Chich et al. |
| 2010/0043312 A1 | 2/2010 | Chich et al. |
| 2010/0144266 A1 | 6/2010 | Lowe et al. |
| 2010/0192478 A1 | 8/2010 | Horton |
| 2011/0030287 A1 | 2/2011 | More |

(56) References Cited

U.S. PATENT DOCUMENTS

| | | | |
|---|---|---|---|
| 2011/0111609 A1 | 5/2011 | Goto | |
| 2011/0111690 A1 | 5/2011 | Henderson | |
| 2011/0124280 A1 | 5/2011 | Railkar | |
| 2011/0138710 A1 | 6/2011 | Reisdorf | |
| 2011/0154743 A1 | 6/2011 | Railkar | |
| 2011/0195655 A1 | 8/2011 | Holland et al. | |
| 2011/0201266 A1 | 8/2011 | Henderson | |
| 2011/0265407 A1 | 11/2011 | Bryson | |
| 2011/0277394 A1 | 11/2011 | Chich et al. | |
| 2013/0023197 A1 | 1/2013 | Grisham et al. | |
| 2014/0099887 A1 | 4/2014 | Gassman et al. | |

FOREIGN PATENT DOCUMENTS

| | | |
|---|---|---|
| GB | 2083204 | 3/1982 |
| GB | 2186898 | 8/1987 |
| GB | 2335666 | 9/1999 |
| GB | 2425319 | 10/2006 |
| JP | 5806423 | 4/1983 |
| WO | 07/055964 | 5/2007 |
| WO | 07/055968 | 5/2007 |

OTHER PUBLICATIONS

Part 1—Request for Inter Partes Reexamination of U.S. Pat. No. 6,793,574, Control No. 95/001,952 dated Mar. 29, 2012 (pp. 1-100).
Part 2—Request for Inter Partes Reexamination of U.S. Pat. No. 6,793,574, Control No. 95/001,952 dated Mar. 29, 2012 (pp. 101-149 and exhibits).
Office Action granting Inter Partes Reexamination of U.S. Pat. No. 6,793,574, Control No. 95/001,952 dated May 9, 2012.
Office Action regarding Inter Partes Reexamination of U.S. Pat. No. 6,793,574, Control No. 95/001,952 dated May 9, 2012.
Patent Owner's Response Pursuant to 37 CFR Section 1.945 regarding Inter Partes Reexamination of U.S. Pat. No. 6,793,574, Control No. 95/001,952 dated Jul. 5, 2012.
Requester Comments After Patent Owner's Response regarding Inter Partes Reexamination of U.S. Pat. No. 6,793,574, Control No. 95/001,952 dated Aug. 6, 2012.
Submission of signed Declaration of Denise Laytart in support of Requester Comments After Patent Owner's Response regarding Inter Partes Reexamination of U.S. Pat. No. 6,793,574, Control No. 95/001,952 dated Aug. 13, 2012.
Patent Owner's Amendment and Response regarding Inter Partes Reexamination of U.S. Pat. No. 6,793,574, Control No. 95/001,952 dated Sep. 26, 2012.
Office Action closing prosecution regarding Inter Partes Reexamination of U.S. Pat. No. 6,793,574, Control No. 95/001,952 dated Aug. 28, 2012.
Patent Owner's Petition Under 37 CFR Section 1.182—Request for Continued Reexamination regarding Inter Partes Reexamination of U.S. Pat. No. 6,793,574, Control No. 95/001,952 dated Sep. 27, 2012.
Patent Owner's Amendment and Response regarding Inter Partes Reexamination of U.S. Pat. No. 6,793,574, Control No. 95/001,952 dated Oct. 23, 2012.
Requester Comments after Patent Owner's Response regarding Inter Partes Reexamination of U.S. Pat. No. 6,793,574, Control No. 95/001,952 dated Oct. 26, 2012.
Office Action denying Request for Inter Partes Reexamination of U.S. Pat. No. 6,482,084, Control No. 95/001,953 dated May 11, 2012.
Requester's Petition Under 37 CFR Sections 1.927 and 1.181 for Supervisory Review of Refusal to Order Reexamination of Claims 1-8 of U.S. Pat. No. 6,482,084 regarding Request for Inter Partes Reexamination of U.S. Pat. No. 6,482,084, Control No. 95/001,953 dated Jun. 8, 2012.
Decision on Petition Under 37 CFR 1.181 and 1.927 regarding Request for Inter Partes Reexamination of U.S. Pat. No. 6,482,084, Control No. 95/001,953 dated Jul. 25, 2012.
Office Action denying Request for Inter Partes Reexamination of U.S. Pat. No. 6,299,528, Control No. 95/001,954 dated May 11, 2012.
Requester's Petition Under 37 CFR Sections 1.927 and 1.181 for Supervisory Review of Refusal to Order Reexamination of Claims 1-3 of U.S. Pat. No. 6,299,5284 regarding Request for Inter Partes Reexamination of U.S. Pat. No. 6,299,528, Control No. 95/001,954 dated Jun. 8, 2012.
Decision on Petition Under 37 CFR 1.181 and 1.927 regarding Request for Inter Partes Reexamination of U.S. Pat. No. 6,299,528, Control No. 95/001,954 dated Jul. 25, 2012.
Office Action granting Request for Inter Partes Reexamination of U.S. Pat. No. 6,299,528, Control No. 95/002,080 dated Sep. 13, 2012.
Office Action regarding Request for Inter Partes Reexamination of U.S. Pat. No. 6,299,528, Control No. 95/002,080 dated Sep. 13, 2012.
Patent Owner Air Vent, Inc.'s Response to Office Action of Sep. 13, 2012 regarding Request for Inter Partes Reexamination of U.S. Pat. No. 6,299,528, Control No. 95/002,080 dated Nov. 12, 2012.
Requestor Comments after Patent Owner's Response regarding Request for Inter Partes Reexamination of U.S. Pat. No. 6,299,528, Control No. 95/002,080 dated Dec. 12, 2012.
Office Action granting Request for Inter Partes Reexamination of U.S. Pat. No. 6,482,084, Control No. 95/002,081 dated Sep. 13, 2012.
Office Action regarding Request for Inter Partes Reexamination of U.S. Pat. No. 6,482,084, Control No. 95/002,081 dated Sep. 13, 2012.
Patent Owner Air Vent, Inc.'s Response to Office Action of Sep. 13, 2012 regarding Request for Inter Partes Reexamination of U.S. Pat. No. 6,482,084, Control No. 95/002,081 dated Nov. 12, 2012.
Requestor Comments after Patent Owner's Response regarding Request for Inter Partes Reexamination of U.S. Pat. No. 6,482,084, Control No. 95/002,081 dated Dec. 12, 2012.
Part 1—Request for Inter Partes Reexamination of U.S. Pat. No. 6,482,084, Control No. 95/001,953 dated Mar. 30, 2012 (pp. 1-135).
Part 2—Request for Inter Partes Reexamination of U.S. Pat. No. 6,482,084, Control No. 95/001,953 dated Mar. 30, 2012 (pp. 136-221 and exhibits).
Part 1—Request for Inter Partes Reexamination of U.S. Pat. No. 6,299,528, Control No. 95/001,954 dated Mar. 30, 2012 (pp. 1-100).
Part 2—Request for Inter Partes Reexamination of U.S. Pat. No. 6,299,528, Control No. 95/001,954 dated Mar. 30, 2012 (pp. 101-142 and exhibits).
Request for Inter Partes Reexamination of U.S. Pat. No. 6,299,528, Control No. 95/002,080 dated Aug. 16, 2012.
Request for Inter Partes Reexamination of U.S. Pat. No. 6,482,084, Control No. 95/002,081 dated Aug. 16, 2012.
Defendant Owens Corning Corporation's Non-Infringement and Invalidity Contentions Pursuant to LPR 3.4 dated Feb. 20, 2012 in Civil Action No. 10-1699, *Air Vent, Inc.* v. *Owens Corning Corporation*, United States District Court for the Western District of Pennsylvania.
Complaint for Patent Infringement [Doc. 1] dated Dec. 17, 2010 in Civil Action No. 10-1699, *Air Vent, Inc.* v. *Owens Corning Corporation*, United States District Court for the Western District of Pennsylvania.
Plaintiff's Motion for Preliminary Injunction [Doc. 10] dated Feb. 14, 2011 in Civil Action No. 10-1699, *Air Vent, Inc.* v. *Owens Corning Corporation*, United States District Court for the Western District of Pennsylvania.
Plaintiff's Memorandum in Support of Motion for a Preliminary Injunction [Doc. 11] dated Feb. 14, 2011 in Civil Action No. 10-1699, *Air Vent, Inc.* v. *Owens Corning Corporation*, United States District Court for the Western District of Pennsylvania.
Declaration of Robert Bradley Holland and Exhibits 7-10 in Support of Plaintiff's Memorandum in Support of Motion for a Preliminary Injunction [Doc. 15] dated Feb. 15, 2011 in Civil Action No. 10-1699, *Air Vent, Inc.* v. *Owens Corning Corporation* , United States District Court for the Western District of Pennsylvania.
Defendant's Memorandum in Opposition to Air Vent, Inc.'s Motion for Preliminary Injunction [Doc. 25] dated Mar. 7, 2011 in Civil

(56) References Cited

OTHER PUBLICATIONS

Action No. 10-1699, *Air Vent, Inc.* v. *Owens Corning Corporation*, United States District Court for the Western District of Pennsylvania.
Air Vent's Reply to Owens Corning's Opposition to Motion for a Preliminary Injunction [Doc. 32] dated Mar. 14, 2011 in Civil Action No. 10-1699, *Air Vent, Inc.* v. *Owens Corning Corporation*, United States District Court for the Western District of Pennsylvania.
Amended Complaint for Patent Infringement [Doc. 41] dated Jul. 14, 2011 in Civil Action No. 10-1699, *Air Vent, Inc.* v. *Owens Corning Corporation*, United States District Court for the Western District of Pennsylvania.
Memorandum in Support of Plaintiffs Motion for a Preliminary Injunction [Doc. 44] dated Jul. 26, 2011 in Civil Action No. 10-1699, *Air Vent, Inc.* v. *Owens Corning Corporation*, United States District Court for the Western District of Pennsylvania.
Defendant's Motion to Dismiss Count Three of Plaintiff's Amended Complaint Pursuant to Federal Rule of Civil Procedure 12(b)(6) [Doc. 45] in Civil Action No. 10-1699, *Air Vent, Inc.* v. *Owens Corning Corporation*, United States District Court for the Western District of Pennsylvania.
Defendant's Memorandum in Support of its Motion to Dismiss Count Three of Plaintiff's Amended Complaint Pursuant to Federal Rule of Civil Procedure 12(b)(6) [Doc. 46] dated Aug. 1, 2011 in Civil Action No. 10-1699, *Air Vent, Inc.* v. *Owens Corning Corporation*, United States District Court for the Western District of Pennsylvania.
Defendant's Memorandum in Opposition to Air Vent, Inc.'s Renewed Motion for Preliminary Injunction [Doc. 49] dated Aug. 10, 2011 in Civil Action No. 10-1699, *Air Vent, Inc.* v. *Owens Corning Corporation*, United States District Court for the Western District of Pennsylvania.
Plaintiff's Memorandum in Opposition to Defendant's Motion to Dismiss [Doc. 52] dated Aug. 22, 2011 in Civil Action No. 10-1699, *Air Vent, Inc.* v. *Owens Corning Corporation*, United States District Court for the Western District of Pennsylvania.
Plaintiff's Reply to Defendant's Opposition to Motion for a Preliminary Injunction [Doc. 54] dated Aug. 26, 2011 in Civil Action No. 10-1699, *Air Vent, Inc.* v. *Owens Corning Corporation*, United States District Court for the Western District of Pennsylvania.
Defendant's Reply in Support its Motion to Dismiss Count Three of the Amended Complaint [Doc. 57] dated Sep. 8, 2011 in Civil Action No. 10-1699, *Air Vent, Inc.* v. *Owens Corning Corporation*, United States District Court for the Western District of Pennsylvania.
Plaintiff's Surreply in Opposition to Defendant's Motion to Dismiss [Doc. 60] dated Sep. 12, 2011 in Civil Action No. 10-1699, *Air Vent, Inc.* v. *Owens Corning Corporation*, United States District Court for the Western District of Pennsylvania.
Reply to Plaintiff's Surreply in Opposition to Defendant's Motion to Dismiss Count Three of the Amended Complaint [Doc. 63] dated Sep. 16, 2011 in Civil Action No. 10-1699, *Air Vent, Inc.* v. *Owens Corning Corporation*, United States District Court for the Western District of Pennsylvania.
Defendant's Motion for Summary Judgment of Non-Infringement of U.S. Pat. Nos. 6,299,528 and 6,482,084 [Doc. 64] dated Oct. 25, 2011 in Civil Action No. 10-1699, *Air Vent, Inc.* v. *Owens Corning Corporation*, United States District Court for the Western District of Pennsylvania.
Defendant's Memorandum in Support of its Motion for Summary Judgment of U.S. Pat. Nos. 6,299,528 and 6,482,084 [Doc. 65] dated Oct. 25, 2011 in Civil Action No. 10-1699, *Air Vent, Inc.* v. *Owens Corning Corporation*, United States District Court for the Western District of Pennsylvania.
Concise Statement of Undisputed Facts in Support of Defendant's Motion for Summary Judgment of Non-Infringement of U.S. Pat. Nos. 6,299,528 and 6,482,084 [Doc. 66] dated Oct. 25, 2011 in Civil Action No. 10-1699, *Air Vent, Inc.* v. *Owens Corning Corporation*, United States District Court for the Western District of Pennsylvania.
Appendix of Exhibits in Support of Defendant's Concise Statement of Undisputed Facts in Support of Defendant's Motion for Summary Judgment of Non-Infringement of U.S. Pat. Nos. 6,299,528 and 6,482,084 [Doc. 67] dated Oct. 25, 2011 in Civil Action No. 10-1699, *Air Vent, Inc.* v. *Owens Corning Corporation*, United States District Court for the Western District of Pennsylvania.
Defendant Owens Corning Corporation's Answer, Affirmative Defenses and Counterclaims to Plaintiff's Amended Complaint for Patent Infringement [Doc. 69] dated Nov. 14, 2011 in Civil Action No. 10-1699, *Air Vent, Inc.* v. *Owens Corning Corporation*, United States District Court for the Western District of Pennsylvania.
Plaintiff Air Vent, Inc.'s Answer to Defendant Owens Corning Corporation's Counterclaims [Doc. 71] dated Nov. 22, 2011 in Civil Action No. 10-1699, *Air Vent, Inc.* v. *Owens Corning Corporation*, United States District Court for the Western District of Pennsylvania.
Plaintiffs Memorandum in Opposition to Defendant's Motion for Summary Judgment of Non-Infringement of U.S. Pat. Nos. 6,299,528 and 6,482,04 [Doc. 72] dated Nov. 22, 2011 in Civil Action No. 10-1699, *Air Vent, Inc.* v. *Owens Corning Corporation*, United States District Court for the Western District of Pennsylvania.
Declaration of David L. Roodvoets in Support of Plaintiff's Memorandum in Opposition to Defendant's Motion for Summary Judgment of Non-Infringement of U.S. Pat. Nos. 6,299,528 and 6,482,04 [Doc. 73] dated Nov. 22, 2011 in Civil Action No. 10-1699, *Air Vent, Inc.* v. *Owens Corning Corporation*, United States District Court for the Western District of Pennsylvania.
Plaintiffs Response to Defendant's Concise Statement of Facts in Opposition to Defendant's Motion for Summary Judgment [Doc. 75] dated Nov. 22, 2011 in Civil Action No. 10-1699, *Air Vent, Inc.* v. *Owens Corning Corporation*, United States District Court for the Western District of Pennsylvania.
Defendant's Reply in Support of its Motion for Summary Judgment of Non-Infringement of U.S. Pat. Nos. 6,299,528 and 6,482,084 [Doc. 80] dated Dec. 6, 2011 in Civil Action No. 10-1699, *Air Vent, Inc.* v. *Owens Corning Corporation*, United States District Court for the Western District of Pennsylvania.
Plaintiff's Surreply in Opposition to Defendant's Motion for Summary Judgment of Non-Infringement [Doc. 83] dated Dec. 14, 2011 in Civil Action No. 10-1699, *Air Vent, Inc.* v. *Owens Corning Corporation*, United States District Court for the Western District of Pennsylvania.
Defendant's Reply to Plaintiffs Surreply [Doc. 87] dated Dec. 23, 2011 in Civil Action No. 10-1699, *Air Vent, Inc.* v. *Owens Corning Corporation*, United States District Court for the Western District of Pennsylvania.
Plaintiff's Reply to Defendant's Reply [Doc. 92] dated Dec. 28, 2011 in Civil Action No. 10-1699, *Air Vent, Inc.* v. *Owens Corning Corporation*, United States District Court for the Western District of Pennsylvania.
Plaintiff's Second Amended Complaint for Patent Infringement [Doc. 130] dated Aug. 29, 2012 in Civil Action No. 10-1699, *Air Vent, Inc.* v. *Owens Corning Corporation*, United States District Court for the Western District of Pennsylvania.
Defendant Owens Corning Corporation's Answer, Affirmative Defenses and Counterclaims to Plaintiff's Second Amended Complaint for Patent Infringement [Doc. 134] dated Sep. 19, 2012 in Civil Action No. 10-1699, *Air Vent, Inc.* v. *Owens Corning Corporation*, United States District Court for the Western District of Pennsylvania.
Declaration of David L. Roodvoets in Support of Plaintiff's Opposition to Defendant's Motion to Stay [Doc. 136] dated Sep. 24, 2012 in Civil Action No. 10-1699, *Air Vent, Inc.* v. *Owens Corning Corporation*, United States District Court for the Western District of Pennsylvania.
Installation Instructions for Owens Corning VentSure Rigid Strip Ridge Vent dated Mar. 2000 (4 pages).
Owens Corning Press Release—Great Exterior Makeover—dated Oct. 13, 1999.
Installation Instructions for Owens Corning VentSure Rigid Strip Ridge Vent dated Oct. 1999 (6 pages).

(56) References Cited

OTHER PUBLICATIONS

Notice of Allowance from U.S. Appl. No. 29/332,162 dated Jul. 15, 2009.
Notice of Allowance from U.S. Appl. No. 29/327,214 dated Sep. 13, 2010.
Office action from U.S. Appl. No. 11/267,739 dated Sep. 24, 2008.
Office action from U.S. Appl. No. 11/267,739 dated Dec. 18, 2008.
Office action from U.S. Appl. No. 11/267,702 dated Sep. 24, 2008.
Office action from U.S. Appl. No. 11/267,702 dated Dec. 23, 2008.
Office action from U.S. Appl. No. 29/434,133 dated Dec. 31, 2013.
Notice of Allowance from U.S. Appl. No. 29/434,133 dated Mar. 25, 2014.
SmartVent 6 Step Installation Guide, DCI Products, Inc., 10 pgs., 2011.
Office action from U.S. Appl. No. 13/842,381 dated Sep. 23, 2016.
Office action from U.S. Appl. No. 13/842,381 dated Mar. 24, 2017.
Office action from U.S. Appl. No. 13/842,381 dated Nov. 15, 2017.

* cited by examiner

RIDGE VENT

CROSS-REFERENCE TO RELATED APPLICATIONS

This application claims the benefit of U.S. Design applications No. 29/327,214, filed Oct. 31, 2008, and No. 29/332,162, filed Feb. 10, 2009, the disclosures of which are incorporated herein by reference.

BACKGROUND

Buildings, such as for example residential buildings, may be covered by a sloped roof. The interior portion of the building located directly below the sloped roof can form a space called an attic. If unventilated, condensation can form on the interior surfaces within the attic. The condensation can cause damage to various building components within the attic, including, but not limited to the insulation, as well as potentially causing damage to the building structure of the attic. Accordingly, it is known to ventilate attics thereby helping to prevent the formation of condensation. One example of a method of ventilating an attic includes the positioning of ridge vents at the roof ridge, which is the intersection of the uppermost sloping roof planes. The ridge vents can cooperate with eave vents, positioned in the eaves, to allow a flow of air to enter the eave vents, travel through a space between adjoining roof rafters to the attic, travel through the attic and exit through the ridge vents.

Ridge vents can be positioned over an elongated opening formed between the uppermost sloping roof planes. The opening can allow hot air within the attic to escape the attic. Ridge vents can be provided in discrete sections that can be placed end-to-end over the opening. The discrete sections of the ridge vents can be flexed to conform to the shape of the sloping roof planes and attached to the roof planes via roof nails. It would be advantageous if ridge vents were easier to install.

SUMMARY

In accordance with embodiments of this invention, there are provided ridge vents configured to cover an open ridge of a roof and allow a flow of air to exit from the open ridge through the ridge vents. The ridge vents include a center portion having a length and a plurality of grooves. Left and right portions are connected to the center portion. The center portion is configured to flex along it's length, thereby forming a ridge vent angle between the left and right portions. The formed ridge vent angle is configured to correspond with a slope between roof decks defining the open ridge.

In accordance with other embodiments, there are also provided ridge vents configured to cover an open ridge of a roof and allow a flow of air to exit from the open ridge through the ridge vents. The ridge vents include a center portion having opposing ends. Each of the opposing ends has a plurality of projections, each having a plurality of legs that have a cross-sectional shape in the form of a "V". The plurality of legs form sealing structures. Left and right portions are connected to the center portion. The plurality of legs of the plurality of projections are configured to nest against each other as the center portion of the ridge vent is flexed, thereby forming sealing structures at the end of the center portion of the ridge vent.

In accordance with other embodiments, there are also provided methods for installing ridge vents over an open ridge of a roof and allow a flow of air to exit from the open ridge through the ridge vents. The methods include the steps of providing a ridge vent, the ridge vent having a center portion and a left and right portion connected to the center portion, the center portion having a length and a plurality of grooves, the grooves having a shallow dome-shaped cross-sectional shape, wherein the center portion is configured to flex along it's length, thereby forming a ridge vent angle between the left and right portions, flexing a first ridge vent to form a ridge vent angle, wherein the ridge vent angle is configured to correspond with a slope between roof decks defining the open ridge, positioning the first flexed ridge vent over the open ridge of the roof, fastening the first flexed ridge vent to the roof decks, flexing subsequent ridge vents, connecting the subsequently flexed ridge vents to the previously installed ridge vents, fastening the subsequently flexed ridge vents to the roof decks and covering the installed ridge vents with ridge shingles.

Various objects and advantages will become apparent to those skilled in the art from the following detailed description of the invention, when read in light of the accompanying drawings. It is to be expressly understood, however, that the drawings are for illustrative purposes and are not to be construed as defining the limits of the invention.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, a ridge vent is provided. It will be understood the term "ridge" refers to the intersection of the uppermost sloping roof planes. The term "roof plane" is defined to mean the plane defined by a roof surface. The term "slope" is defined to mean the degree of roof incline expressed as a ratio of the rise in inches to the run of roof. The term "sheathing", as used herein, is defined to mean exterior grade boards used as a roof deck material. The term "roof deck", as used herein is defined to mean the surface installed over the supporting framing members to which the roofing is applied. The term "louvers" as used herein, is defined to mean a quantity of openings positioned in the ridge vent and used for ventilation purposes.

Figure 1:
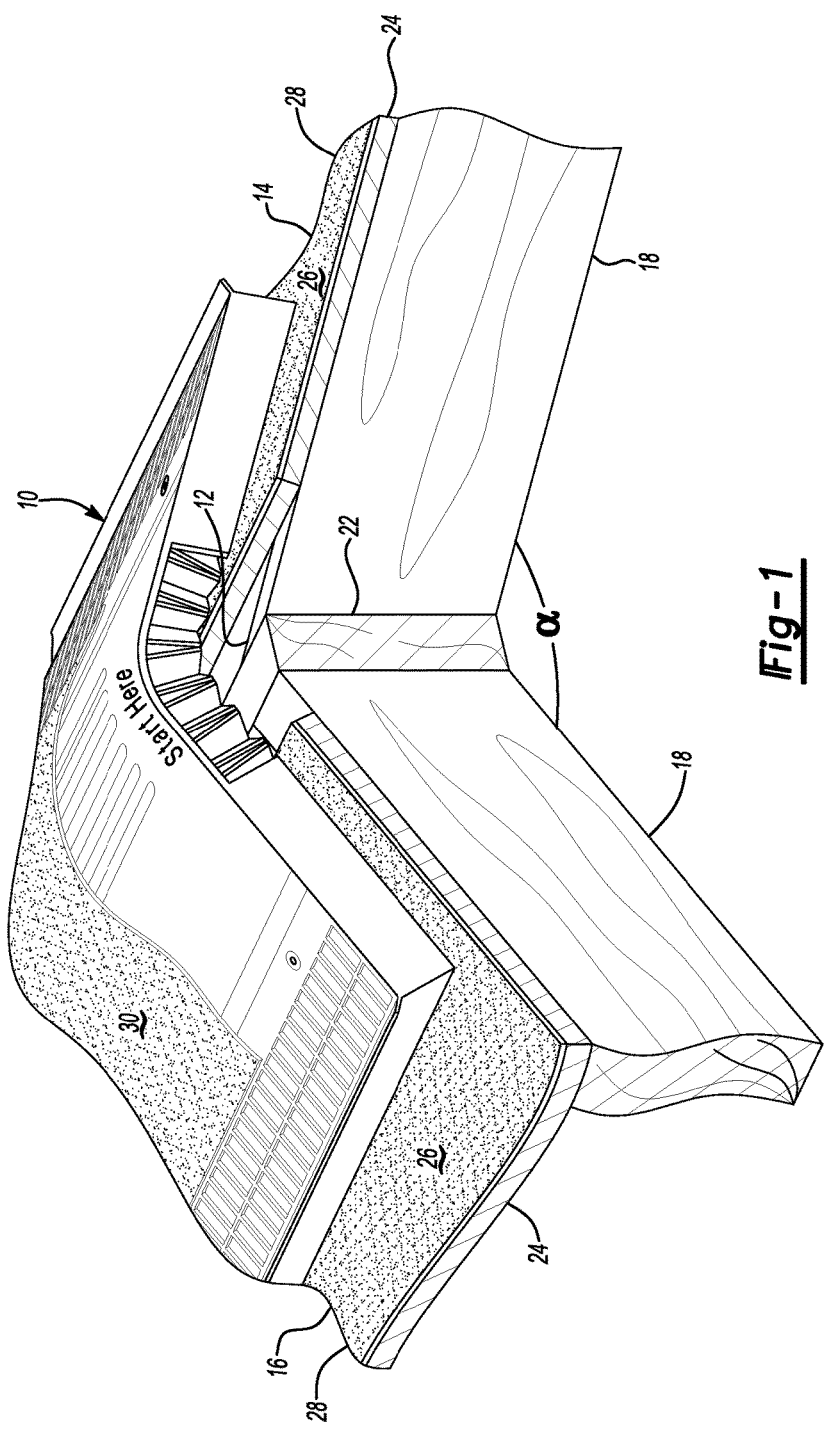
FIG. 1 is a partial perspective view of a ridge vent shown installed on a portion of a roof in accordance with embodiments of this invention.
Figure 2:
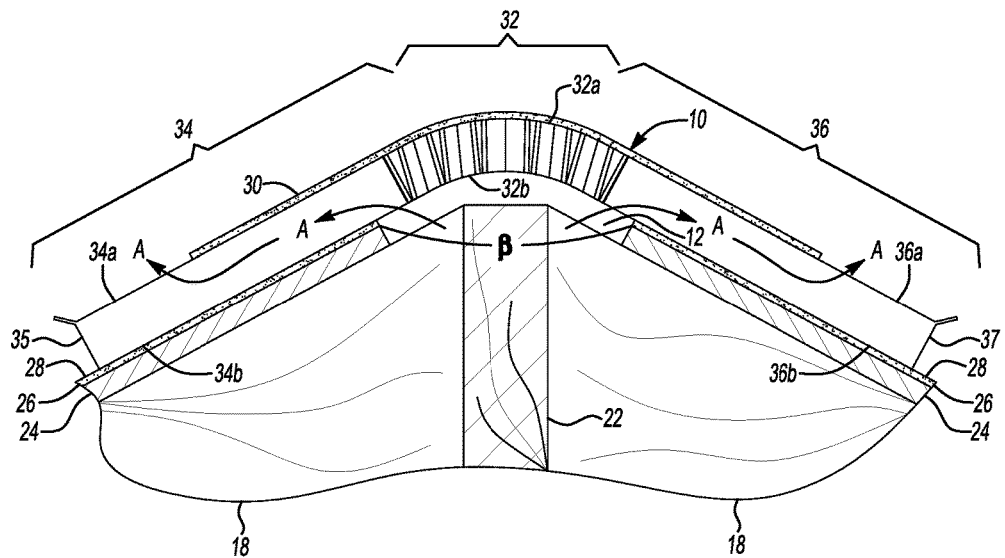
FIG. 2 is a front elevational view of the ridge vent of FIG. 1 shown installed on a portion of a roof.

Referring now to FIGS. 1 and 2, an exemplary ridge vent 10 is shown. Generally, the ridge vent 10 is configured to span a ridge opening 12 formed between opposing first and second roof planes, 14 and 16, and allow a flow of air to travel through an attic and exit through the ridge vent 10.

Each of the first and second roof planes, 14 and 16, is formed by a series of generally parallel, spaced apart rafters 18 (for purposes of clarity, only one rafter 18 is shown for each of the roof planes, 14 and 16). In the illustrated embodiment, the rafters 18 are connected at one end to a ridge board 22 and at the other end to a wall (not shown). In other embodiments, the ends of the rafters 18 can be connected to other desired components or structures. In the illustrated embodiment, the rafters 18 and the ridge board 22 are made from framing lumber, having sizes including, but not limited to 2 inches thick by 10 inches wide. Alternatively, the rafters 18 and the ridge board 22 can be made from other desired materials and have other desired sizes.

The first and second roof planes, 14 and 16, intersect with the ridge board 22 thereby forming slope angle α. In the illustrated embodiment, the slope angle α is approximately 120°. Alternatively, the slope angle α can be more or less than approximately 120°.

As shown in FIGS. 1 and 2, the rafters 18 are covered by sheathing 24. The sheathing 24 is configured to form an upper surface 28 of the roof planes, 14 and 16. In the illustrated embodiment, the sheathing 24 is made of a wood-based material, including, but not limited to oriented strand board or plywood. In other embodiments, the sheathing 24 can be other desired materials.

The upper surface 28 of the roof planes, 14 and 16, supports a plurality of shingles 26. The shingles 26 are attached to the upper surface 28 of the sheathing 24 by using any desired fasteners, including, but not limited to roofing nails (not shown). It should be understood that the shingles 26 can be any desired roofing material.

While the ridge opening 12 shown in FIGS. 1 and 2 is formed by the structure of the rafters 18, ridge board 22 and roof planes, 14 and 16, it should be understood the ridge opening 12 can be formed by other structures or combinations of structures.

As shown in FIG. 2, the ridge vent 10 includes a center portion 32, a left portion 34 and a right portion 36. The center portion 32, left portion 34 and the right portion 36 each have a top surface, 32a, 34a and 36a, respectively and a bottom surface 32b, 34b and 36b, respectively. The left portion 34 has a left edge 35 and the right portion 36 has a right edge 37.

Referring again to FIG. 2, the center portion 32 of the ridge vent 10 is configured to flex, thereby allowing the left and right portions, 34 and 36, to form a ridge vent angle β. The ridge vent angle β is configured to allow the bottom surfaces, 34b and 36, of the left and right portions, 34 and 36, to seat against the first and second roof planes, 14 and 16. In the illustrated embodiment, the ridge vent angle β is the same angle as the slope angle α formed by the opposing rafters 18. In other embodiments, the ridge vent angle β can be other angles suitable to allow the bottom surfaces, 34b and 36, of the left and right portions, 34 and 36, to seat against the first and second roof planes, 14 and 16. As will be explained later in more detail, the left and right portions, 34 and 36, of the ridge vent 10 are fastened to the roof planes, 14 and 16, and portions of the ridge vent 10 are covered by a row of vent shingles 30.

As shown in FIG. 2, the ridge vent 10 spans the ridge opening 12 formed between the first and second roof planes, 14 and 16, and allows a flow of exhaust air to travel through an attic and exit through the ridge vent 10. The flow of the exhaust air is shown by the arrows A.

Figure 3:
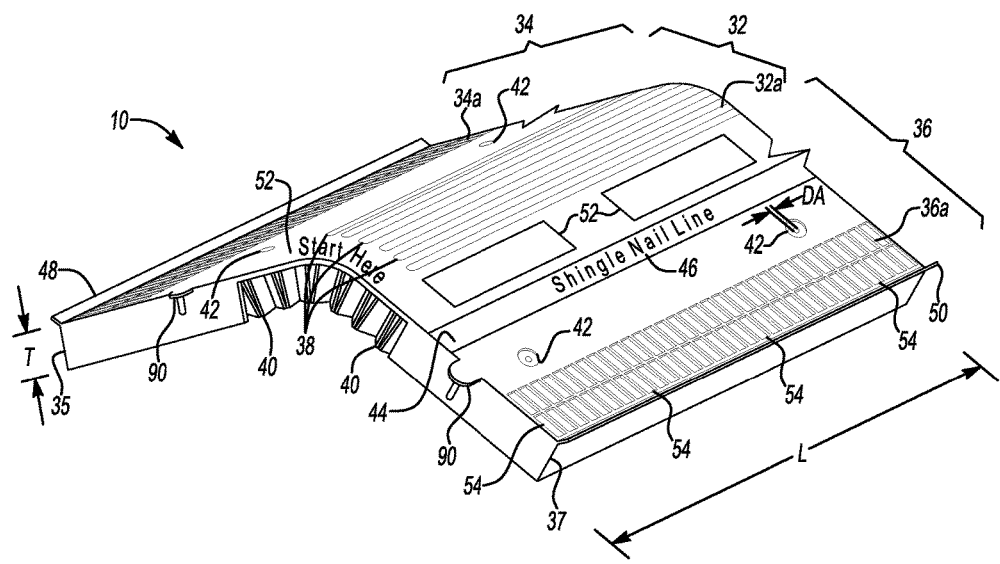
FIG. 3 is a partial perspective view of the ridge vent of FIG. 1 illustrated in a flexed position.

Referring now to FIG. 3, the ridge vent 10 is shown in a flexed position. The ridge vent 10 has a length L and a thickness T. In the illustrated embodiment, the length L is approximately 48 inches and the thickness is approximately 1.0 inches. Alternatively, the length L of the ridge vent 10 can be more or less than approximately 48 inches and the thickness T can be more or less than approximately 1.0 inches.

The center portion 32 includes a plurality of optional grooves 38. Generally, the grooves 38 are configured to provide sufficient flexibility to the center portion 32 to allow the ridge vent 10 to flex in a direction generally perpendicular to the length L of the ridge vent 10, while also providing structural reinforcement to the center portion 32. The combination of flexibility and structural reinforcement provided by the grooves 38 allows a controlled curvature of the ridge vent 10 as the ridge vent 10 is flexed. The controlled curvature provides the flexed ridge vent 10 with a smooth curvature when installed on a roof. However, configuring the ridge vent 10 to include the grooves 38 is optional and not necessary for the use of the ridge vent 10.

As shown in FIG. 3, the grooves 38 are oriented to extend in a direction generally parallel to each other and parallel to the edges, 35 and 37. Alternatively, the grooves 38 can have other orientations sufficient to allow the ridge vent 10 to flex in a direction generally perpendicular to the length L of the ridge vent 10, while also providing structural reinforcement to the center portion 32. The grooves will be discussed in more detail below.

Figure 6:
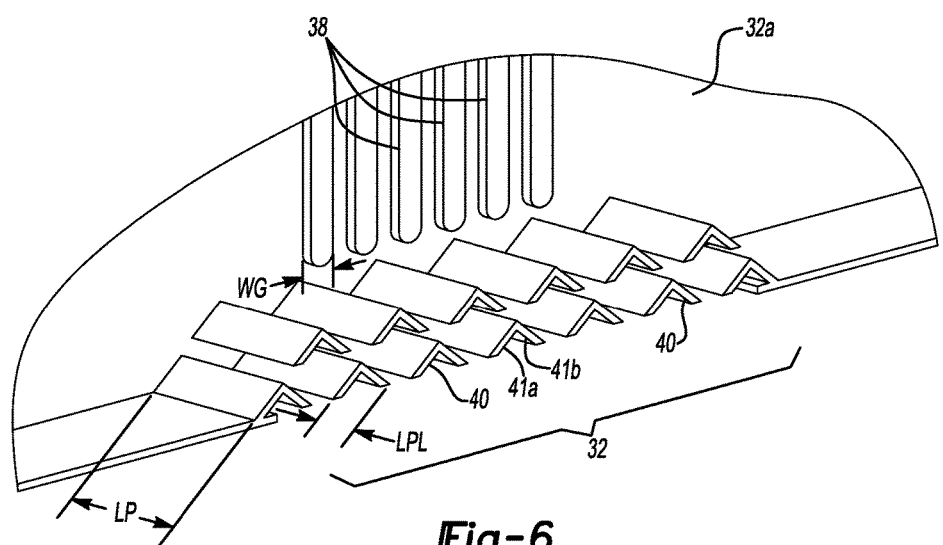
FIG. 6 is a perspective view of a portion of the ridge vent of FIG. 1 illustrating projections positioned within the central portion.

As shown in FIGS. 3 and 6, the center portion 32 of the ridge vent 10 includes a plurality of projections 40 extending from the top surface 32a of the center portion 32. The plurality of projections 40 are configured to nest against each other as the center portion 32 of the ridge vent 10 is flexed, thereby effectively sealing the end of the center portion 32 of the ridge vent 10. The projections 40 will be discussed in more detail below.

Referring again to FIG. 3, the left and right portions, 34 and 36, have fastening apertures 42. The fastening apertures 42 are spaced apart along the length L of the ridge vent 10. The fastening apertures 42 are configured to allow a fastener (not shown) to be inserted into the fastening aperture 42 and held in the fastening aperture 42 after insertion, thereby allowing the installer to position the ridge vent 10 on the roof prior to securing the ridge vent 10 to the roof planes, 14 and 16. In one embodiment, the fastener is a roofing nail. In other embodiments, the fastener can be other desired devices, including, but not limited to flat-headed screws. The aperture 42 has an internal diameter DA. In the illustrated embodiment, the internal diameter DA is approximately 0.120 inches corresponding to a roofing nail having a 12 gauge shank diameter. Alternatively, the internal diameter DA can be more or less than approximately 0.120 inches corresponding to roofing nails having other desired shank diameters.

As shown in FIG. 3, the left and right portions, 34 and 36, each have a nail line 44 (for purposes of clarity, only the nail line 44 on right portion 36 is shown). The nail line 44 extends along the length L of the ridge vent 10 and generally parallel to the edge 37. The nail line 44 is configured to provide locations in which the installer can nail ridge vent shingles 30 to the ridge vent 10. The installation of the ridge vent 10 and ridge vent shingles 30 will be discussed in more detail below. In the illustrated embodiment, the nail line 44 includes a plurality of images 46. The images 46 include suggested nail insertion positions and instructions to the installer for installing ridge vent shingles over the ridge vent 10. Alternatively, the nail line 44 can be void of any images or the nail line 44 can include any desired images.

Referring again to FIG. 3, the ridge vent 10 includes a left wing 48 and a right wing 50. The left wing 48 is positioned on the top surface 34a of the left portion 34 at the left edge 35. Similarly, the right wing 50 is positioned on the top surface 36a of the right portion 36 at the right edge 50. In the illustrated embodiment, the wings, 48 and 50, extend along the length L of the ridge vent 10. Alternatively, the wings, 48 and 50, can extend a desired distance that is shorter than the length L of the ridge vent 10. Generally, the wings, 48 and 50, are configured to assist in the flow of air through the ridge vent 10. The flow of air through the ridge vent 10 will be discussed in more detail below.

As shown in FIG. 3, optionally the ridge vent 10 includes indicia 52 positioned on the top surfaces, 32a, 34a and 36a of the ridge vent 10. For purposes of clarity, the indicia 52 is only shown on the right portion 36 and at one end of the center portion 32. The indicia 52 can include a variety of desired messages, including, but not limited to product and company logos, promotional messages, installation instructions and product features. However, configuring the ridge vent 10 to include indicia 52 is optional and not necessary for the use of the ridge vent 10.

Referring again to FIG. 3, the ridge vent 10 includes a plurality of louvers 54. In operation, the flow of air through the ridge vent 10 exits through the louvers 54. In the illustrated embodiment, the louvers 54 are arranged in a column and row configuration having a quantity of two columns and rows extending substantially along the length L of the ridge vent 10. In other embodiments, the louvers 54 can be arranged in other desired configurations. As shown in FIG. 3, the louvers 54 are positioned such that an outward column is substantially adjacent an edge, 35 or 37. In other embodiments, the louvers 54 can be positioned in other desired locations sufficient to allow the flow of air to exit the ridge vent 10 through the louvers 54.

Figure 4:
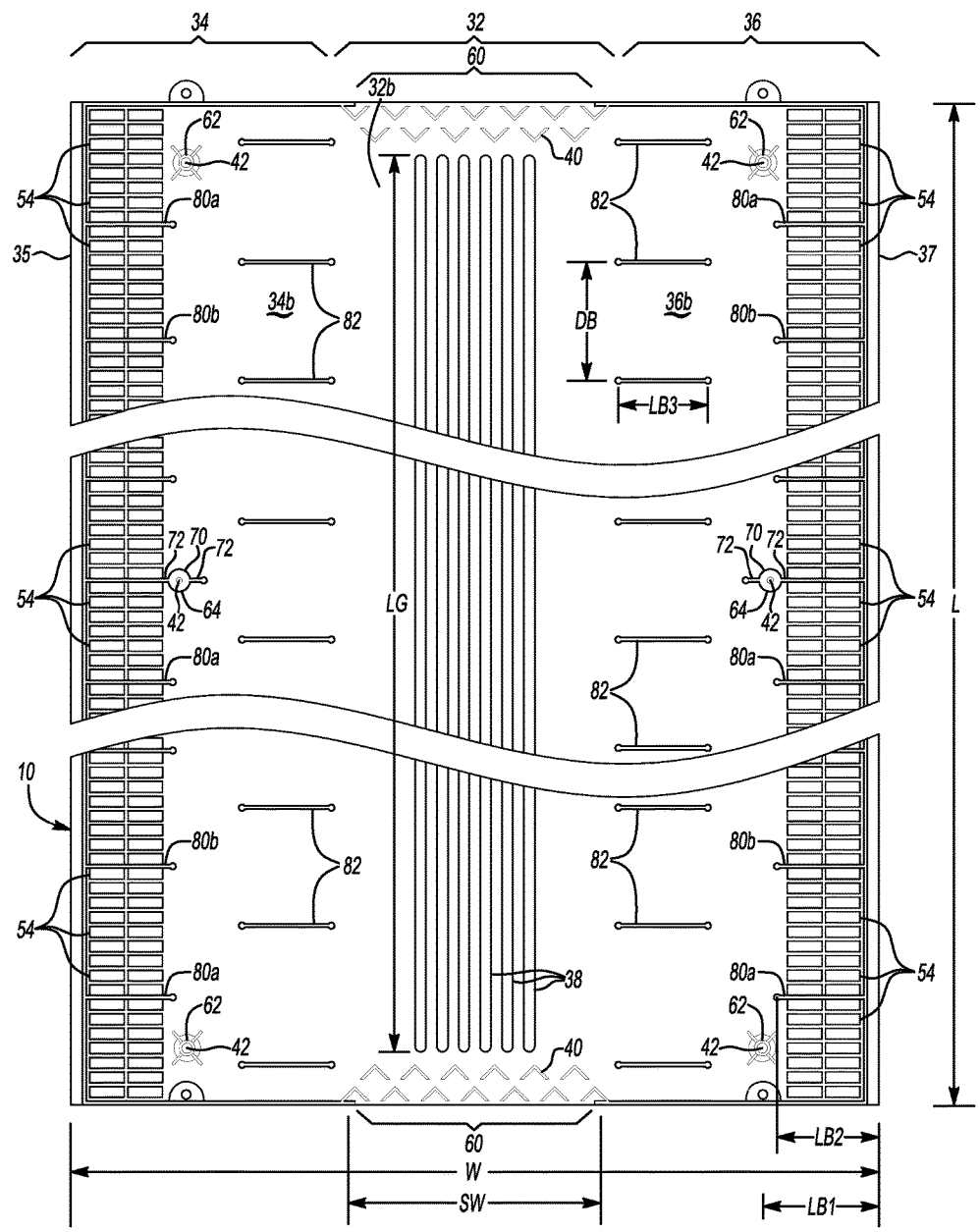
FIG. 4 is an elevational view of the bottom of the ridge vent of FIG. 1.
Figure 5:
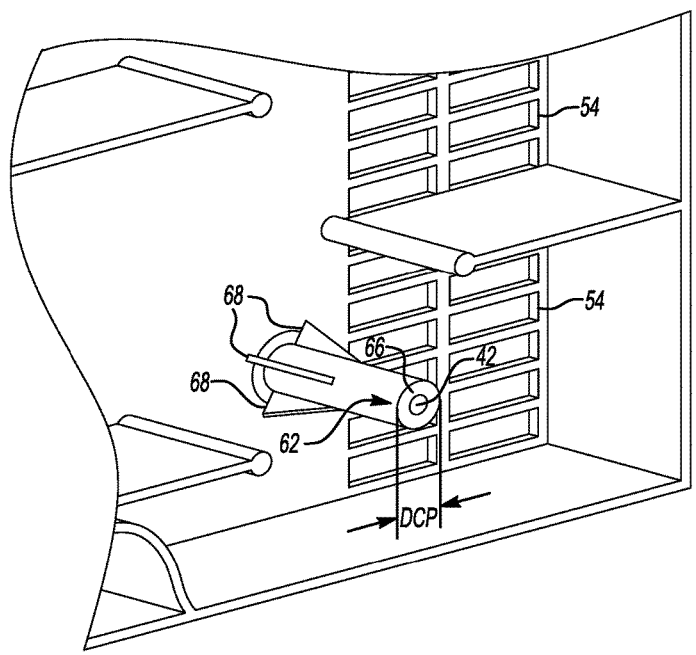
FIG. 5 is a perspective view of a portion of the ridge vent of FIG. 1 illustrating a first nailing boss.

As shown in FIGS. 3-5, the louvers 54 have a square shape. In other embodiments, the louvers 54 can have other shapes, including, but not limited to round or hexagonal shapes sufficient to allow the flow of air to exit the ridge vent 10 through the louvers 54.

Referring now to FIG. 4, the ridge vent 10 has an un-flexed width W extending from the left edge 35 to the right edge 37. In the illustrated embodiment, the width W is approximately 14.35 inches. Alternatively, the width W can be more or less than approximately 14.35 inches.

Figure 4A:
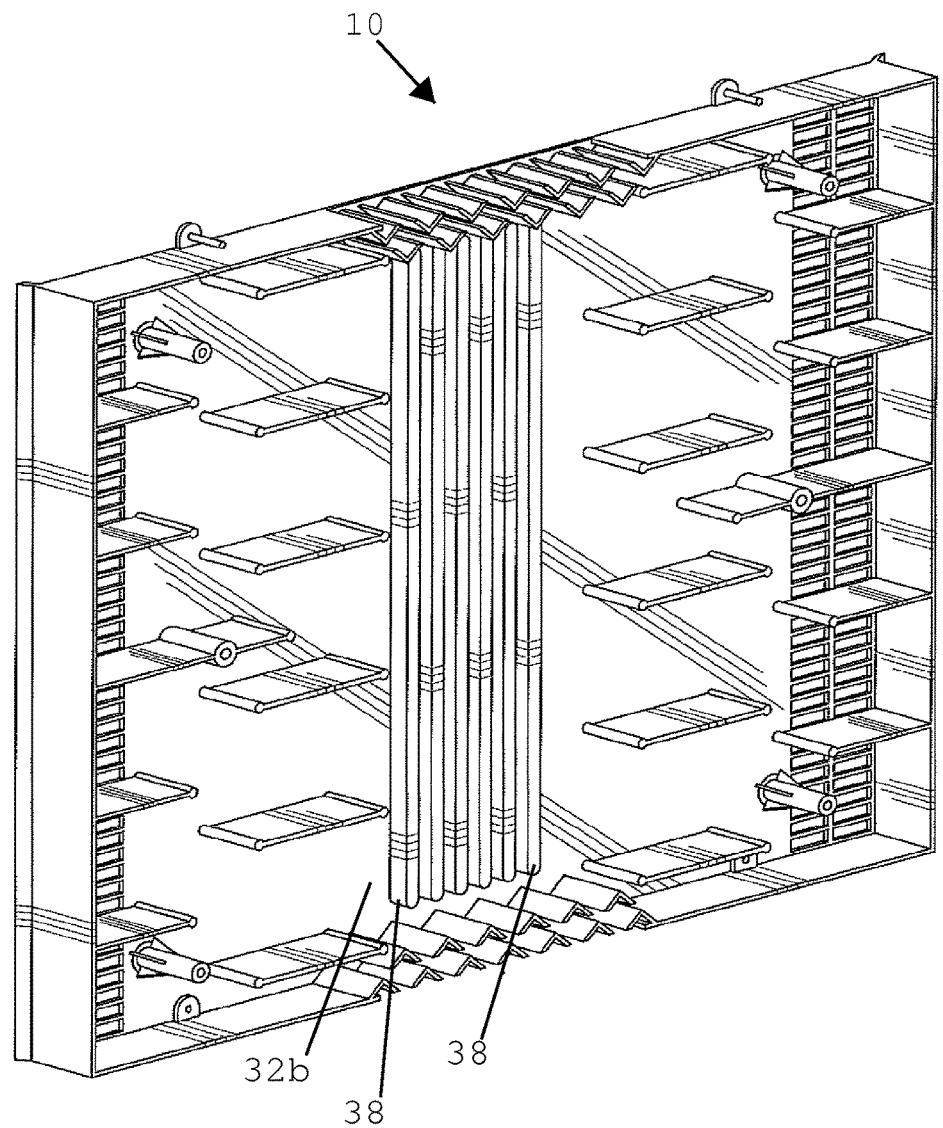
FIG. 4A is a bottom perspective view of a ridge vent.

As shown in FIGS. 4 and 4A, the bottom surface 32b of the center portion 32, the bottom surface 34b of the left portion 34 and the bottom surface 36b of the right portion 36 are illustrated. As discussed above, the center portion 32 of the ridge vent 10 includes the grooves 38. As shown in FIG. 4, the grooves 38 extend substantially the length L of the ridge vent 10, but somewhat shorter, and are substantially centered between the projections 40 located at the ends of the ridge vent 10. The grooves have a length LG. In the illustrated embodiments, the length LG of the grooves 38 is approximately 46.0 inches. In other embodiments, the length LG of the grooves 38 may longer or shorter than approximately 46.0 inches.

Referring now to FIGS. 4A and 6, the grooves 38 have a shallow, domed cross-sectional shape that extends the length LG of the grooves 38. In other embodiments, the grooves 38 can have other cross-sectional shapes sufficient to provide sufficient flexibility to the center portion 32 to allow the ridge vent 10 to flex while also providing structural reinforcement to the center portion 32. It is also within the contemplation of this invention that the grooves 38 may have differing cross-sectional shapes. In still other embodiments, the grooves 38 may having cross-sectional shapes that vary along the length LG of the grooves 38.

As shown in FIG. 6, the grooves 38 have a width WG. In the illustrated embodiment, the width WG of the grooves 38 is approximately 0.25 inches. Alternatively, the width WG of the grooves can be more or less than approximately 0.25 inches.

Referring again to the illustrated embodiment shown in FIG. 4, the ridge vent 10 has a quantity of six grooves 38. Alternatively, the ridge vent 10 can have more or less than six grooves 38.

As shown in FIGS. 4 and 6, the plurality of projections 40 extend from the bottom surface 32b of the center portion 32. As discussed above, the plurality of projections 40 are configured to nest against each other as the center portion 32 of the ridge vent 10 is flexed, thereby forming a sealing structure for the end of the center portion 32 of the ridge vent 10. In the illustrated embodiment, the projections 40 have a cross sectional shape in the form of a "V" wherein the tip of the "V" points in a direction toward the groves 38. In other embodiments, the projections can have other desired cross-sectional shapes and can be oriented in different directions sufficient to form a sealing structure by nesting against each other as the center portion 32 of the ridge vent 10 is flexed, thereby effectively sealing the end of the center portion 32 of the ridge vent.

As shown in FIG. 6, the projections 40 have two projection legs, 41a and 41b, that intersect to form the "V" shape of the projection 40. In the illustrated embodiment, the projection legs, 41a and 41b, have a same length LPL of approximately 3/8 inches. In other embodiments, the length LPL of the projection legs, 41a and 41b, can be more or less than approximately 3/8 inches. In still other embodiments, the length LPL of the projection legs, 41a and 41b, can be different from each other. While the embodiment shown in FIG. 6 illustrates the projections 40 as having a "V" shape, it is within the contemplation of this invention that the projections 40 could have other desired shapes, including, but not limited to a "U" shape or a "W" shape.

Referring again to FIGS. 4 and 6, the projections 40 are positioned in rows and arranged such that the projections 40 of the inner most row straddle the projections 40 of the outer row. Alternatively, the projections 40 can be positioned in any desired quantity of rows and can be arranged in any desired configuration, sufficient to nest against each other as the center portion 32 of the ridge vent 10 is flexed, thereby effectively sealing the end of the center portion 32 of the ridge vent.

As shown in FIG. 6, the projections 40 have a projection length LP. In the illustrated embodiment, the projection length LP is approximately 1.0 inches. In other embodiments, the projection length LP can be more or less than approximately 1.0 inches.

While the embodiment shown in FIGS. 4 and 6 illustrates a quantity of seven projections 40 positioned in the outer row and a quantity of six projections 40 positioned in the inner most row, it should be understood that any desired quantity of projections 40 can be used sufficient to nest against each other as the center portion 32 of the ridge vent 10 is flexed, thereby effectively sealing the end of the center portion 32 of the ridge vent.

Referring again to FIG. 4, as the ridge vent 10 is flexed, the plurality of projections 40 form a sealed portion 60 at each end of the ridge vent 10. The sealed portion 60 has a pre-sealed width SW. In the illustrated embodiment, the pre-sealed width SW is approximately 4.0 inches. However, the pre-sealed width SW can be other desired dimensions.

Referring now to FIGS. 4 and 5 and as discussed above, the ridge vent 10 has a plurality of fastening apertures 42, positioned in the left and right portions, 34 and 36, and spaced apart along the length L of the ridge vent 10. As best shown in FIG. 4, the fastening apertures 42 are defined by a plurality of first nailing bosses 62 and a plurality of second nailing bosses 64. Generally, the first nailing bosses 62 are positioned near the ends of the ridge vent 10 and the second nailing bosses 64 are positioned within the interior of the ridge vent 10, although such is not required. As best shown in FIG. 5, the first nailing bosses 62 include a cylindrical portion 66 and a plurality of gussets 68. The cylindrical portion 64 is configured to extend from the bottom surfaces, 34b and 36b, of the left and right portions, 34 and 36, to the roof planes, thereby providing a solid support surface for seating the fastener. The cylindrical portion 66 has a diameter DCP. In the illustrated embodiment, the diameter DCP of the cylindrical portion 66 is approximately 5/16 inches. Alternatively, the diameter DCP of the cylindrical portion 66 can be more or less than approximately 5/16 inches.

Referring again to FIG. 5, the gussets 68 are configured to provide support for the cylindrical portion 66. While the gussets 68 in the illustrated embodiment have a triangular shape, the gussets 68 can have any desired shape sufficient to provide support for the cylindrical portion 66. In the illustrated embodiment, a quantity of four gussets 68 are provided for each cylindrical support 66, it should be understood than any number of gussets 68, sufficient to support the cylindrical portion 66, can be provided.

Figure 7:
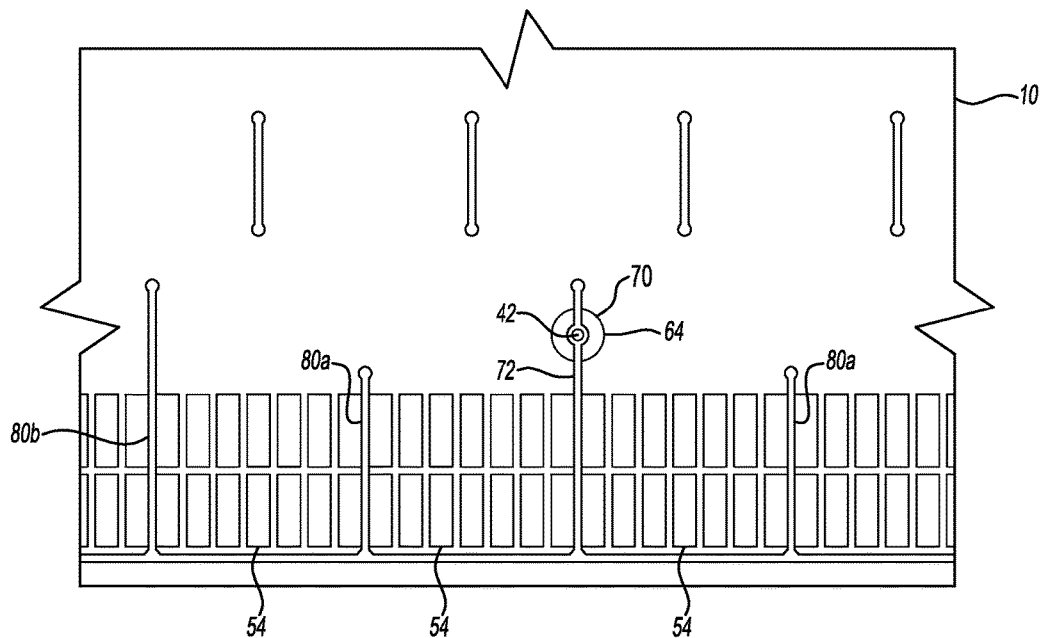
FIG. 7 is an elevational view of a portion of the bottom of the ridge vent of FIG. 1 illustrating a second nailing boss.

As shown in FIGS. 4 and 7, the second nailing bosses 64 have a cylindrical portion 70 and are supported by a nailing baffle 72. The cylindrical portion 70 is the same as the cylindrical portion 66 for the first nailing boss 62. The nailing baffle 72 is configured to support the cylindrical portion 66. Any desired number of second nailing bosses 64 can be used.

Referring again to FIG. 4, the ridge vent 10 includes a plurality of edge baffles, 80a and 80b, and interior baffles 82. The edge baffles, 80a and 80b, extend in a direction that is generally perpendicular to either the left or right edge, 35 or 37, toward the center portion 32 of the ridge vent 10. The edge baffles, 80a and 80b, are configured to provide structural support to the right and left edges, 35 and 37, as well as providing structural support to the areas of the left and right portions, 34 and 36, in which the louvers 54 are positioned. The edge baffles, 80a and 80b, extend different lengths from the edges, 35 or 37. In the illustrated embodiment, the edge baffles 80a extend a length LB1 of approximately 1.75 inches and the edge baffles 80b extend a length LB2 of approximately 2.50 inches. Alternatively the lengths LB1 and LB2, can be other desired lengths sufficient configured to provide structural support to the right and left edges, 35 and 37, as well as providing structural support to the areas of the left and right portions, 34 and 36, in which the louvers 54 are positioned. In the illustrated embodiment, all of the edge baffles 80a have the same length LB1. In other embodiments, the edge baffles 80a can be varying lengths. Similarly, it is also within the contemplation of this invention that the edge baffles 80b can have varying lengths.

As shown in FIG. 4, the interior baffles 82 are oriented in a direction that is generally perpendicular to the grooves 38 and extend in a line along the length L of the ridge vent 10. The interior baffles 82 are positioned between the grooves 38 and the louvers 54. The interior baffles 82 are configured to provide structural support to the left and right portions, 34 and 36. In the illustrated embodiment, the interior baffles 82 have a length LB3 of approximately 1.25 inches and have a distance DB between the interior baffles of approximately 2.00 inches. Alternatively the length LB3 and the distance DB can be other desired dimensions sufficient configured to provide structural support to the left and right portions. While the interior baffles 82 in the illustrated embodiment are all shown to have the same length LB3, it is within the contemplation of this invention that the interior baffles 82 can have varying lengths.

While the embodiment shown in FIG. 4 illustrates the edge baffles, 80a and 80b, and interior baffles 82 as straight members that are oriented to be substantially perpendicular to the edges, 35 and 37, it is within the contemplation of this invention that the edge baffles, 80a and 80b, and interior baffles 82. could be curved members or have curved portions and also could be oriented at a desired angle to the edges, 35 and 37.

Figure 8:
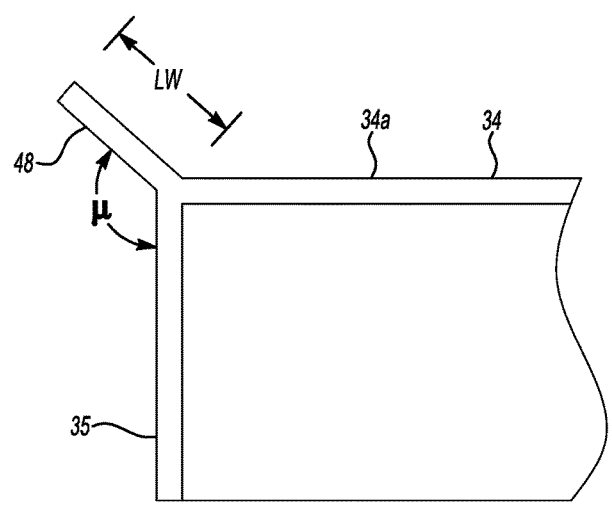
FIG. 8 is a side elevational view of a portion of the ridge vent of FIG. 1 illustrating a wing.

Referring now to FIGS. 3 and 8, the ridge vent 10 has a left wing 48 and a right wing 50 (for purposes of clarity, FIG. 8 provides an enlarged view of the left wing 48). The left wing 48 extends in an upward direction and beyond the square-shaped profile created by the intersection of the left edge 35 and the top surface 34a of the left portion 34. Without being bound by the theory, it is believed that as wind encounters one of the left or right wings, 48 or 50, flowing in a direction toward the center portion 32 of the ridge vent 10, the wing deflects the wind up and over the louvers 54, creating an area of relatively lower pressure above the louvers 54. The area of low pressure above the louvers 54 causes a lifting action thereby pulling air through the ridge vent 10 and out of the attic. Accordingly, the area of relatively lower pressure, caused by the wings, 48 and 50, facilitates the exit flow of attic air through the ridge vent 10. In the illustrated embodiment, the left wing 48 has a length LW of approximately 0.375 inches. In other embodiments, the length LW can be more or less than approximately 0.375 inches sufficient to facilitate the exit flow of attic air through the ridge vent 10. The left wing 48 forms a wing angle μ with the left edge 35. In the illustrated embodiment, the wing angle μ is approximately 135°. In other embodiments, the wing angle μ can be more or less than approximately 135° sufficient to facilitate the exit flow of attic air through the ridge vent 10.

Figure 9:
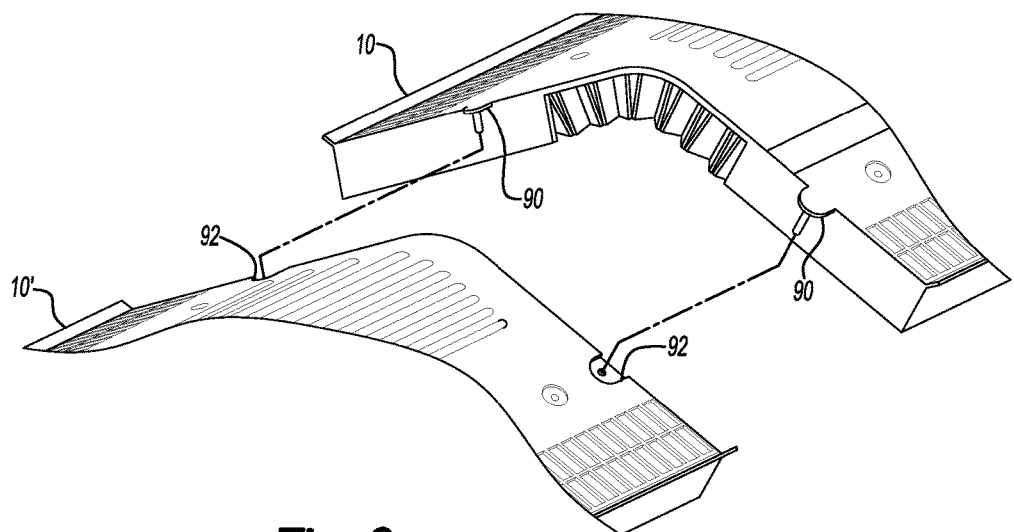
FIG. 9 is a partial perspective view of the ridge vent of FIG. 1 connected to a second ridge vent.

Referring now to FIG. 9, a plurality of attachment fixtures 90 are connected to one end of the ridge vent 10. A plurality of corresponding attachment receptacles 92 are positioned at the opposite end of the ridge vent 10. As shown in FIG. 9, the ridge vent 10 is connected to a second ridge vent 10' by connecting the attachment fixtures 90 of ridge vent 10 to the corresponding attachment receptacles 92 of ridge vent 10'. The connection between the ridge vent 10 and the second ridge vent 10' is configured to provide a quick, easy and gapless connection that can be accomplished without the use of special tools. In the illustrated embodiment, the attachment fixtures 90 are pins and the attachment receptacles 92 are corresponding apertures. Alternatively, other desired structures, including, but not limited to dovetail joints, tongue and groove joints and tabs and slots, can be used.

Referring now to FIGS. 1-3, the ridge vent 10 is installed over the ridge opening 12 in the following steps. First, a first ridge vent 10 is flexed thereby forming ridge vent angle β between the left and right portions, 34 and 36. The ridge vent 10 is flexed until the ridge vent angle β is the same as the slope angle α formed by the opposing rafters 18. Next, the flexed ridge vent 10 is positioned over the ridge opening 12 and fastened to the first and second roof planes, 14 and 16. The first ridge vent 10 is installed such that the attachment fixtures 90 are positioned at the edge of the roof planes, 14 and 16. The flexed ridge vent 10 is fastened to the roof planes, 14 and 16, as discussed above. Subsequent ridge vents 10 are flexed in a similar manner and connected to the installed ridge vent until the ridge opening 12 is completely covered. Finally as shown in FIG. 1, a course of ridge vent shingles 30 is installed, in an overlapping manner, over the installed ridge vents 10. In the illustrated embodiment, the ridge vent shingles 30 are installed over the ridge vents 10 using the nail lines 44 as nailing guides. Alternatively, other desired methods, including, but not limited to staples and adhesives, can be used to install the ridge vent shingles 30 over the ridge vents 10.

As discussed above, the ridge vent 10 is configured for several functions, including spanning a ridge opening 12 and allowing a flow of air to travel through an attic and exit through the ridge vent 10. These functions are performed in an outdoor environment, with all of the elements of the weather. Accordingly, the ridge vent 10 is made of a material sufficient to provide both structural and weatherability features. In the illustrated embodiment, the ridge vent 10 is made of a polypropylene material. Alternatively, the ridge vent 10 can be made of other polymeric materials sufficient to provide both structural and weatherability features. In other embodiments, the ridge vent 10 can be made of other desired materials or a combination of desired materials.

Figure 10:
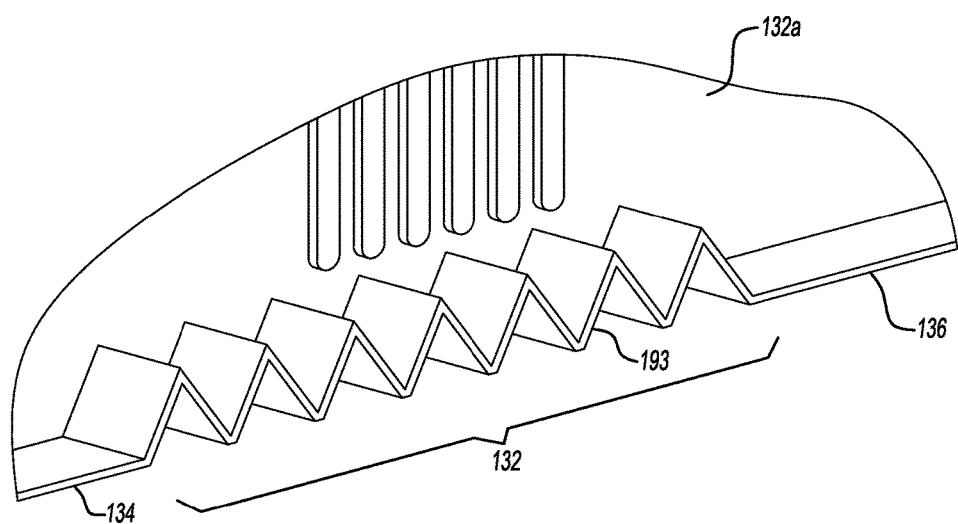
FIG. 10 is a perspective view of a portion of the ridge vent of FIG. 1 illustrating a second embodiment of the projections positioned within the central portion.

In another embodiment of the ridge vent as shown in FIG. 10, the ends of the center portion 132 include a sealing web 193 in lieu of projections. The sealing web 193 extends from the top surface 132a of the center portion 132 and is configured to compress the folds of the sealing web 193 against each other as the center portion 132 of the ridge vent is flexed, thereby effectively sealing the end of the center portion 132 of the ridge vent. While the sealing web 193 is illustrated as having folds with sharp angles, it is within the contemplation of this invention that the folds can be rounded or have other desired shapes sufficient to seal the end of the center portion 132 of the ridge vent.

Figure 11:
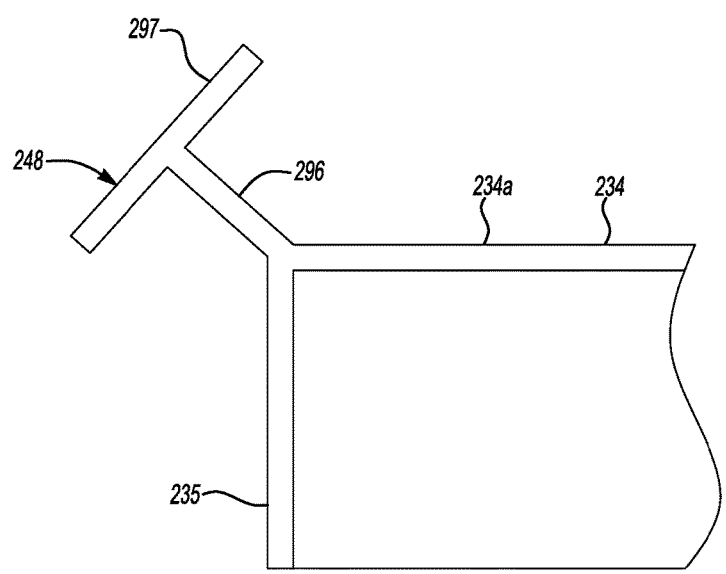
FIG. 11 is a side elevational view of a portion of the ridge vent of FIG. 1 illustrating a second embodiment of the wing.

In another embodiment of the ridge vent as shown in FIG. 11, the ridge vent has a wing 248 has the shape of a spoiler. In the illustrated embodiment, the wing 248 includes a stem 296 and an airfoil 297. The stem 296 extends in an upward direction and beyond the square-shaped profile created by the intersection of the left edge 235 and the top surface 234a of the left portion 234. The airfoil 297 is connected to the stem 296 at an desired angle in order to create the area of relatively lower pressure above the louvers. In the illustrated embodiment, the airfoil 297 has a substantially flat cross-sectional profile. In other embodiments, the airfoil 297 can have other desired cross-sectional profiles for producing desired aerodynamic effects.

The principle and mode of operation of this shingle ridge vent has been described in certain embodiments. However, it should be noted that the shingle ridge vent may be practiced otherwise than as specifically illustrated and described without departing from its scope.

What is claimed is:

1. A ridge vent configured to be positioned with a length of the ridge vent extending along an open ridge of a roof, first and second side edges of the ridge vent disposed on opposite sides of the open ridge to cover the open ridge, and a top surface of the ridge vent that faces away from the open ridge of the roof, the ridge vent further configured to allow a flow of air to exit from the open ridge through the ridge vent, the ridge vent comprising:
    a center portion having a first end, a second end, a plurality of projections at the first and second ends, and a plurality of grooves extending along the length of the ridge vent, wherein the length of the ridge vent extends from the first end to the second end of the center portion, wherein each groove of the plurality of grooves has a groove length that is less than the length of the ridge vent, and wherein each groove of the plurality of grooves has an opening on the top surface of the ridge vent;
    a left portion connected to the center portion and extending to the first side edge;
    a right portion connected to the center portion and extending to the second side edge;
    wherein the grooves of the center portion are configured to allow the ridge vent to flex thereby forming a ridge vent angle between the left and right portions; and
    wherein the formed ridge vent angle is configured to correspond with a slope between roof decks defining the open ridge.

2. The ridge vent of claim 1 in which the grooves extend in a direction parallel to the length of the ridge vent.

3. The ridge vent of claim 1 in which the grooves have a shallow dome-shaped cross-sectional shape.

4. The ridge vent of claim 3 in which the cross-sectional shape of the grooves is consistent along the groove length of the grooves.

5. The ridge vent of claim 1 in which the left portion has a left top surface and a left edge intersecting with the left top surface, the left edge extending downward from the left top surface to form a square shaped profile between the left edge and the left top surface, the left portion having a left wing configured to assist in the flow of air through the ridge vent, the left wing extending upward from the intersection of the left top surface and the left edge and extending the length of the ridge vent.

6. The ridge vent of claim 5 in which the left wing extends beyond the profile created by the intersection of the left top surface and the left edge.

7. The ridge vent of claim 5 in which the right portion has a right top surface and a right edge intersecting with the right top surface, the right edge extending downward from the right top surface to form a square shaped profile between the right edge and the right top surface, the right portion having a right wing configured to assist in the flow of air through the ridge vent, the right wing extending upward from the intersection of the right top surface and the right edge and extending the length of the ridge vent.

8. The ridge vent of claim 7 in which the left and right wings form an angle of approximately 45° with the left and right edges of the ridge vent.

9. The ridge vent of claim 7 in which the left and right wings have a length of approximately ⅜ inches.

10. The ridge vent of claim 5 in which the ridge vent has a plurality of louvers positioned in the left and right portions, wherein the left and right wings form an area of lower pressure over the plurality of louvers.

11. The ridge vent of claim 1 in which the left portion has a left top surface, a left bottom surface, and a left edge intersecting with the left top surface, the left edge extending downward from the left top surface to form a square shaped profile between the left edge and the left top surface, the left portion having a plurality of spaced apart edge baffles along the left bottom surface, each of the plurality of edge baffles being attached to the left edge and extending inward from the left edge toward the center portion.

12. The ridge vent of claim 11 wherein the plurality of edge baffles includes a first set of edge baffles that extend inward from the left edge a first length and a second set of edge baffles that extend inward from the left edge a second length that is shorter than the first length.

13. The ridge vent of claim 12 wherein the plurality of edge baffles are alternatively arranged along the length of the ridge vent between a baffle from the first set and a baffle from the second set.

14. The ridge vent of claim 1 in which the left portion has a left top surface, a left bottom surface, a left edge intersecting with the left top surface, a plurality of first nailing bosses extending downward from the left bottom surface, and a plurality of second nailing bosses extending downward from the left bottom surface, the plurality of second nailing bosses being positioned inward from the ends of the ridge vent relative to the plurality of first nailing bosses, the first nailing bosses having a first cylindrical portion and a plurality of gussets supporting the first cylindrical portion, the second nailing bosses having a second cylindrical portion and a nailing baffle connected to the left edge and extending inward from the left edge.

15. The ridge vent of claim 1 in which the center portion includes a plurality of projections at the first end, the plurality of projections each having a plurality of legs extending toward the first end that have a cross-sectional shape in the form of a "V", the plurality of projections being arranged in an outer row and an inner row, wherein the plurality of legs of the plurality of projections are configured to nest against each other as the center portion of the ridge vent is flexed, thereby forming sealing structures at the first end of the center portion of the ridge vent.

16. The ridge vent of claim 1 wherein the plurality of grooves includes six or more grooves.

17. A method for installing ridge vents over an open ridge of a roof, such that the installed ridge vents allow a flow of air to exit from the open ridge through the ridge vents, the method comprising the steps of:
providing a ridge vent on the open ridge of the roof with a length of the ridge vent extending along the open ridge, first and second side edges of the ridge vent disposed on opposite sides of the open ridge to cover the open ridge, and a top surface of the ridge vent that faces away from the open ridge of the roof, the ridge vent having a center portion, a left portion connected to the center portion and extending to the first side edge, and a right portion connected to the center portion and extending to the second side edge, the center portion having a first end, a second end, a plurality of projections at the first and second ends, and a plurality of grooves extending along the length of the ridge vent, wherein the length of the ridge vent extends from the first end to the second end of the center portion, and wherein each groove of the plurality of grooves has a groove length that is less than the length of the ridge vent, and wherein each groove of the plurality of grooves has an opening on the top surface of the ridge vent;
wherein the grooves that extend along the length of the ridge vent are configured to allow the center portion to flex thereby forming a ridge vent angle between the left and right portions;
flexing a first ridge vent to form a ridge vent angle, wherein the ridge vent angle is configured to correspond with a slope between roof decks defining the open ridge;
positioning the first flexed ridge vent over the open ridge of the roof;
fastening the first flexed ridge vent to the roof decks;
flexing subsequent ridge vents;
connecting the subsequently flexed ridge vents to the previously installed ridge vents;
fastening the subsequently flexed ridge vents to the roof decks; and
covering the installed ridge vents with ridge shingles.

18. The method of claim 17 in which the left portion of the ridge vent include a plurality of first nailing bosses and a plurality of second nailing bosses, the plurality of second nailing bosses being positioned inward from the ends of the ridge vent relative to the plurality of first nailing bosses, the first nailing bosses having a first cylindrical portion and a plurality of gussets supporting the first cylindrical portion, the second nailing bosses having a second cylindrical portion and a nailing baffle connected to a left edge of the left portion and extending inward from the left edge, wherein as a flexed ridge vent is installed over roof decks, each of the plurality of first and second nailing bosses extend from a top surface of the ridge vent to the top surface of the roof decks.

19. The method of claim 17 in which the left portion of the ridge vent has a left top surface and a left edge intersecting with the left top surface, the left edge extending downward from the left top surface to form a square shaped profile between the left edge and the left top surface, the left portion having a left wing configured to assist in the flow of air through the ridge vent, the left wing extending upward from the intersection of the left top surface and the left edge and extending the length of the ridge vent.

20. The method of claim 17 wherein the plurality of grooves of the ridge vent includes six or more grooves.

21. A ridge vent configured to be positioned with a length of the ridge vent extending along an open ridge of a roof and first and second side edges of the ridge vent disposed on opposite sides of the open ridge to cover the open ridge, the ridge vent further configured to allow a flow of air to exit from the open ridge through the ridge vent, the ridge vent comprising:
- a center portion having a first end, a second end, a plurality of projections at the first and second ends, and a plurality of grooves extending along the length of the ridge vent, wherein the length of the ridge vent extends from the first end to the second end of the center portion, wherein each groove of the plurality of grooves has a groove length that is less than the length of the ridge vent, wherein a central axis extends along the length and is located at a center between the first and second side edges of the ridge vent, and wherein no grooves are on the central axis;
- a left portion connected to the center portion and extending to the first side edge;
- a right portion connected to the center portion and extending to the second side edge;
- wherein the grooves of the center portion are configured to allow the ridge vent to flex thereby forming a ridge vent angle between the left and right portions; and
- wherein the formed ridge vent angle is configured to correspond with a slope between roof decks defining the open ridge.

22. The ridge vent of claim 21 wherein the plurality of grooves includes a first group of grooves and a second group of grooves, wherein the first group of grooves are disposed on a first side of the central axis and the second group of grooves are disposed on the opposite side of the central axis.

23. The ridge vent of claim 22 wherein the first group of grooves has a quantity of grooves and the second group of grooves has the quantity of grooves.

24. The ridge vent of claim 21 wherein the plurality of grooves includes six or more grooves.

* * * * *